Jan. 4, 1949.    J. MIHALYI ET AL    2,458,399
SWIVEL MOUNT
Filed July 3, 1945    2 Sheets-Sheet 1
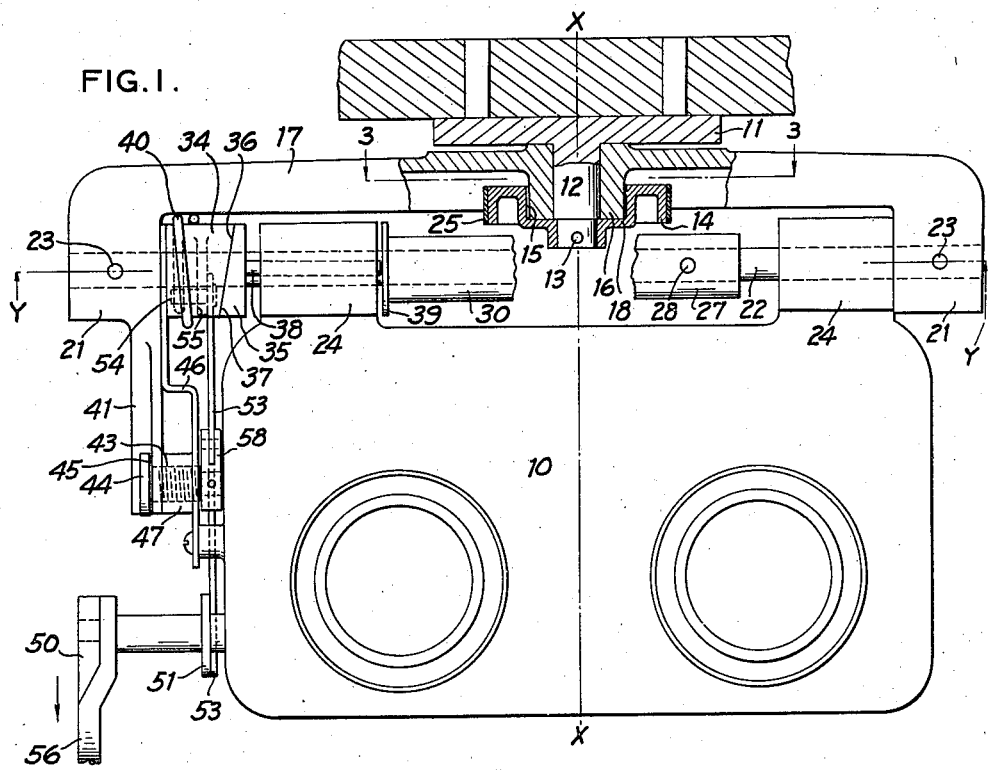
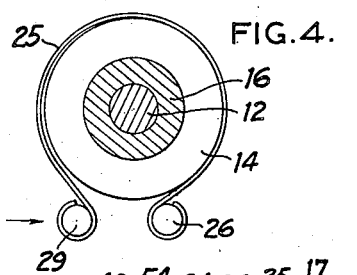
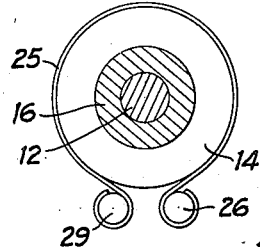
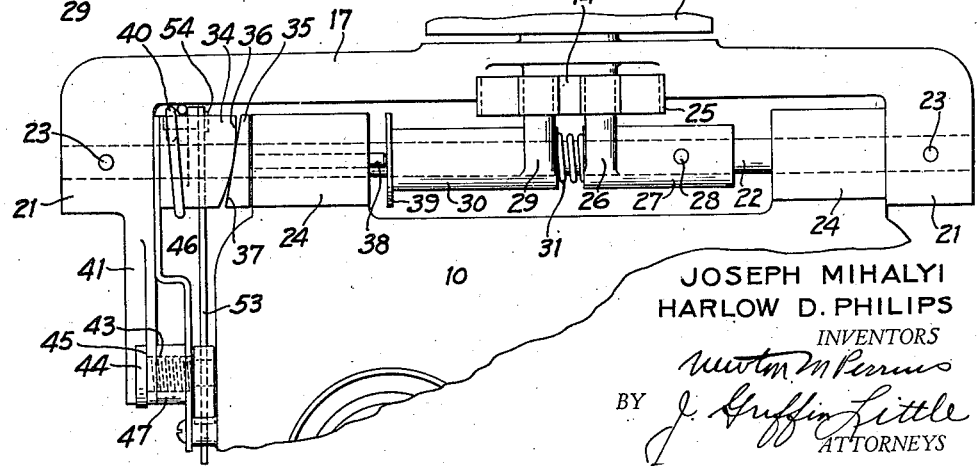
JOSEPH MIHALYI
HARLOW D. PHILIPS
INVENTORS Jan. 4, 1949. J. MIHALYI ET AL 2,458,399
SWIVEL MOUNT Filed July 3, 1945 2 Sheets—Sheet 2

JOSEPH MIHALYI
HARLOW D. PHILIPS
INVENTORS
BY
ATTORNEYS

Patented Jan. 4, 1949

2,458,399

UNITED STATES PATENT OFFICE 2,458,399

SWIVEL MOUNT

Joseph Mihalyi and Harlow D. Philips, Rochester, N. Y., assignors to Eastman Kodak Company, Rochester, N. Y., a corporation of New Jersey Application July 3, 1945, Serial No. 603,008

8 Claims. (Cl. 248—183)

The present invention relates to a mount, and more particularly to a specific form of mount for securing a sighting device such, for example, as a pair of binoculars in position on a ship or aeroplane.

It is essential that an observer be able to swing the binoculars, or other sighting device, easily in azimuth and in elevation while searching for and/or tracking targets. Such swinging is accomplished by mounting the binoculars so that they may be pivoted selectively about a vertical and/or horizontal axis, or may be readily clamped and held in any position of adjustment about said axes.

The present invention has, therefore, as its principal object the provision of a mount designed to permit free movement about a pair of normally arranged axes.

A further object of the invention is the provision of an arrangement for securely holding and locking the sighting device or binoculars in any position of adjustment relative to said axes.

Yet another object of the invention is the provision of a device of the class described which is simple in construction, easy to operate, and highly effective in use.

To these and other ends, the invention resides in certain improvements and combinations of parts, all as will be hereinafter more fully described, the novel features being pointed out in the claims at the end of the specification.

In the drawings:

Fig. 1 is a front elevation of the mount, with parts in section, showing the relation of the parts when the sighting device is released for movement about one or both axes;

Fig. 2 is a partial view of the structure shown in Fig. 1, showing the relation of the parts when the sighting device is locked or is held against movement about either axis;

Fig. 3 is a vertical sectional view taken substantially on lines 3—3 of Fig. 1, showing the brake drum and brake band in their normal positions to clamp or lock the sighting device against movement about the vertical axis X—X;

Fig. 4 is a view similar to Fig. 3 but with the brake band released to free the sighting device and the supporting frame for unitary movement about the vertical axis Y—Y;

Figure 5:
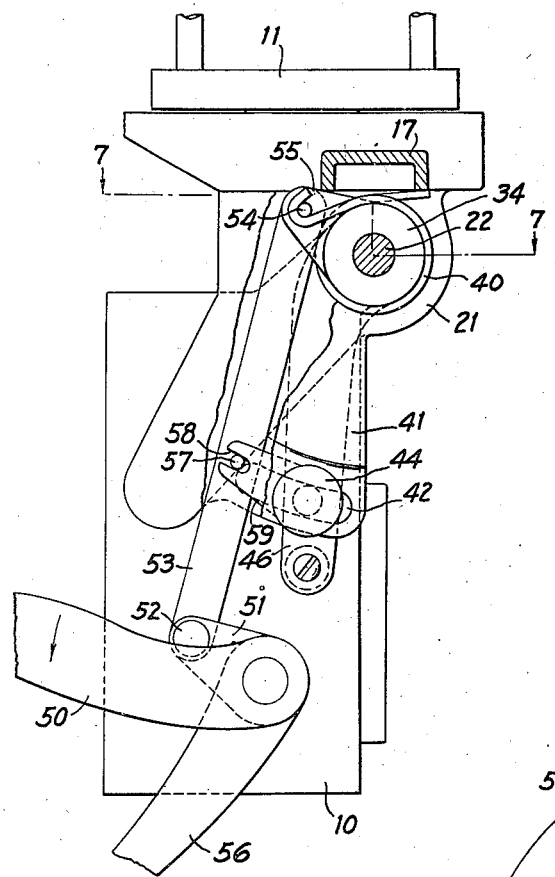
Fig. 5 is a side view of the mount showing the actuating linkage and handle in its normal position with the sighting device locked against rotating about the axes X—X and Y—Y.
Figure 6:
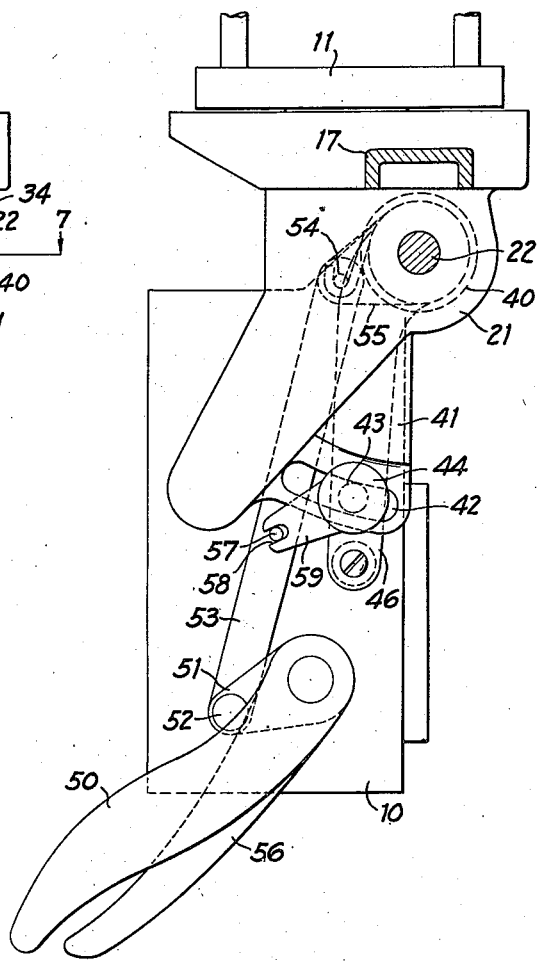
Figure 7:
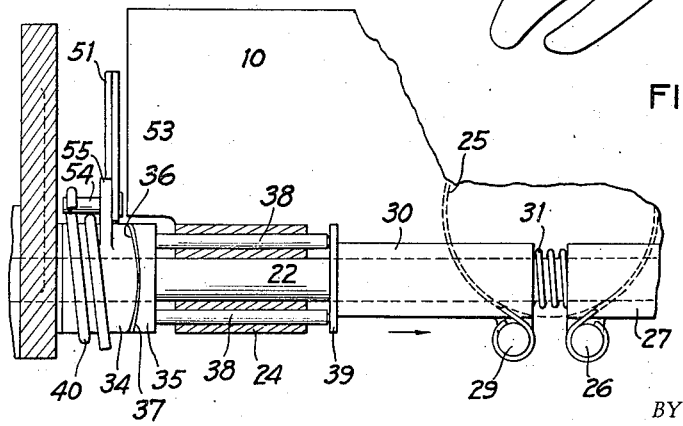

Fig. 6 is a view similar to Fig. 5, but with the parts moved to release the clamping or locking means to free the sighting device for selective movement about the vertical and/or horizontal axes; and Fig. 7 is a plan view of the mount illustrated in Fig. 1, with parts in section, showing the arrangement for transmitting the movement to the brake band to move the latter into clamping relation with the brake drum.

Similar reference numerals throughout the various views indicate the same parts.

The drawings relate to an arrangement by which a sighting device, such as a pair of binoculars, may be mounted on a ship or aeroplane for free and selective movement about a pair of normally arranged axes. When the desired adjustment is secured, separate locking means are readily effective to lock the sighting device against movement about either axis. A single, manually operated handle may be actuated to release simultaneously both locking means to free the device for selective movement about either or both axes, and upon release of the handle both locking means become effective to lock the device against movement.

Referring now to the drawings, there is shown a mount by which a sighting device, such, for example, as a pair of binoculars 10, may be mounted for movement about a vertical axis X—X or a horizontal axis Y—Y, or may be locked against such movements, all as will be hereinafter more fully described. To secure this result, a stationary support 11 is fixedly mounted in a suitable position on a ship or aeroplane. This support is formed with a depending vertical shaft 12 to which is pinned at 13 an annular brake drum 14, as best shown in Fig. 1. The drum is spaced from the shaft 12 to provide an annular recess 15 to receive a similarly shaped sleeve 16 formed on a channel-shaped frame member 17. The support 11, shaft 12, and brake drum 14 thus provide a unitary stationary support on which the frame 17 may be moved about the shaft 12 and axis X—X, the sleeve 16 and frame 17 being supported on the bottom 18 of the brake drum 14, and the shaft 12 forming a bearing for sleeve 16, as best shown in Fig. 1.

The ends 21 of the frame 17 are bent down to form spaced bearings for a horizontally arranged shaft 22, held against rotation by means of pins 23. The sighting device 10 is provided with a pair of spaced arms 24 loosely mounted on and supported by shaft 22 to permit the device 10 to be moved about the shaft 22 and axis Y—Y, thereof. By means of the above-described arrangement, the device 10 may be moved relative to the frame 17 about the horizontal axis Y—Y, or as a unit with frame 17 about the vertical axis X—X.

Such movements enable the observer to swivel the binoculars both in azimuth and in elevation while searching for and/or tracking a target. In order, however, to prevent undesirable swinging of the binoculars about the axis due to the rocking, pitching, or other movement of the ship or plane when the binoculars are not in use, or to retain the binoculars in any desired position of adjustment, it is desirable to supply means for locking the binoculars against rotative movement about either of said axes. To this end, a brake band 25 is wrapped around the brake drum 14 and has one end anchored to a fixed post 26 carried by a sleeve 27 pinned at 28 to shaft 22, as shown in Figs. 1 and 2. The other end of the band 25 is secured to a post 29 carried by a sleeve 30 loosely mounted on the shaft 22. It will now be apparent from an inspection of Figs. 3 and 4 that if the movable post 29 is moved to the right, as indicated by the arrows in Fig. 4, to the position shown in Fig. 3, the brake band will frictionally engage the brake drum 14 to clamp or lock the frame 17 and binoculars 10 against movement about the shaft 12 and the vertical axis X—X thereof. If, however, the post 29 is moved to the left, or to the position shown in Fig. 4, the band 25 will disengage from the drum 14 sufficiently to permit the free and unitary movement of the frame 17 and binoculars 10 about the vertical axis X—X. Thus, with the parts in position shown in Fig. 4, the binoculars 10 can be readily and easily moved in azimuth, but when the parts are in the position shown in Fig. 3, the binoculars are locked or clamped against such movement.

A coil spring 31 loosely carried by shaft 22 and positioned between the fixed sleeve 27 and a movable sleeve 30 tends to move the post 29 and sleeve 30 to the left to release the band 25. A pair of beveled cams 34 and 35 are loosely mounted on the left end of the shaft 22 with adjacent faces 36 and 37 of the cams in engagement, as shown in Figs. 1, 2, and 7. It will now be apparent that if the cam 34 is rotated in a clockwise direction, as viewed in Figs. 5 and 6, the surface 36 thereof will engage the surface 37 of cam 35 to move the latter to the right, as viewed in Figs. 1, 2, and 7. The cam 35 is provided with a plurality of axially projected fingers 38, see Fig. 7, which extend through the left supporting arm 24 of device 10, in such a manner as not to interfere with the movement of the binoculars 10 about the shaft 22. The opposite or right ends of the fingers 38 engage a disk 39 formed on the left end of the sleeve 30. Thus, the rightward movement of the cam 35 is transmitted through the fingers 38 and disk 39 to sleeve 30 to move the latter to the right to shift the post 29 to the position shown in Fig. 3 to bring the band 25 into clamping relation with the brake drum 14.

A large coil spring 40 has one end thereof anchored to the frame 17 and the other end secured to the cam 34 and tends to turn the latter in a clockwise direction, as viewed in Figs. 5 and 6, to shift the cam 35, sleeve 30, and post 29 to the right. The spring 40 is of sufficient strength to overcome spring 31 and tends to normally hold the parts in clamped or locked position shown in Fig. 2, to prevent movement of the binoculars about axis X—X. However, rotation of the cam 34, in a counter-clockwise direction and against the action of spring 40 will move the surface 36 out of engagement with the surface 37 to free cam 35 and sleeve 30. The latter is then free to move to the left, under the action of spring 31, to shift the post 29 to the position shown in Fig. 4 to release the brake band 25 and thus free the frame 17 and binoculars 10 for movement about the shaft 12 and the vertical axis X—X. The rotation of cam 34 may thus be utilized either to lock the frame 17 and binoculars 10 against movement about axis X—X, or may release the locking means to permit such movement.

A plate 41 depends from the left member 21 of the frame 17 and is formed with a curved slot 42, see Figs. 5 and 6, through which the shank of a bolt 43 extends. The head 44 of the bolt is arranged to engage the surface 45 of frame 41 while the shank is threaded into a plate 46 secured to or formed integral with the case of the binoculars 10. A bushing 47 surrounds the shank of the bolt 43 and is positioned intermediate the plates 41 and 46, as shown in Figs. 1 and 2. It will now be apparent that if the bolt 43 is turned in a clockwise direction, as viewed in Figs. 5 and 6, the head 44 will be brought down into clamping relation against the surface 45 of the plate 41 to clamp the latter between the bolt head 44 and the bushing 47. Such clamping will serve to effectively lock the binoculars 10 against rotation about shaft 22 and axis Y—Y. If, however, the bolt 43 is backed off by rotating it in a counter-clockwise direction, the head 44 will be moved out of clamping relation with the surface 45. The binoculars 10 will then be free and may be swung about the axis Y—Y relative to the frame 17 to secure the desired horizontal adjustment. Thus the bolt 43 may be loosened to permit movement of the binoculars about axis Y—Y or may be clamped down to lock the binoculars in any position of adjustment about said axis.

On the other hand, the loosening of the brake band 25 permits the free movement of the frame 17 and binoculars 10 as a unit about the shaft 12 and axis X—X to secure the desired azimuth adjustment while the engagement of the band 25 with the drum 14 locks the members against such movement. Thus the binoculars 10 may be locked or clamped against movement or may be free to move in two directions thus enabling the observer to readily search for and/or track a target.

While the above arrangement provides adequate means for locking and/or releasing binoculars 10 for movement about either axis, it is desirable to provide a single easily operated member by which the observer may readily release the clamping or locking means to permit freedom of movement of the binoculars, and to then again lock the binoculars in any desired position of adjustment. To secure this result, the handle 50 is rockably mounted on the side of the binoculars 10. A crank arm 51 is operatively connected to the handle 50 and is pivotally connected at 52 to a lever or link 53, the opposite end of which is pivotally connected at 54 to a crank 55 operatively connected to or formed integral with the cam 34. It will now be apparent that a downward pull of the handle 50 will draw the lever or link 53 downwardly to thus rotate the crank arm 55 and cam 34 in a counter-clockwise direction. As mentioned above, such movement of the cam 34 will enable spring 31 to shift sleeve 30 and post 29 to the position shown in Fig. 3 to release the brake drum to free frame 17 of binoculars 10 for movement about axis X—X, and upon release of the handle 50, the spring 40 will then automatically turn the parts to the position shown in Fig. 5 to rotate the cam 34 clockwise and thereby shift the cam 35, sleeve 30 and post 29 to the right to the position shown in Fig. 4 to again bring the band 25 into clamping relation to the drum 14 to lock the binoculars 10 and frame 17 against movement about axis X—X. A stationary handle 56 cooperates with the operating handle 50 during the releasing operation. These handles are so positioned that they may be simultaneously grasped by one hand of the operator and by then squeezing the handle 50 it may be moved toward the stationary handle 56 as is apparent, to perform the releasing operation.

It is preferred to utilize this movement of the handle 50 to also release the bolt 43 to also free the binoculars 10 for simultaneous or selective movement about the axis Y—Y. Therefore, the lever 50 is provided with a pin 57 positioned in a forked or slotted end 58 of an arm 59 projecting radially from bolt 43, as shown in Figs. 5 and 6. It will now be apparent from an inspection of these figures, that downward movement of the handle 50 which, as pointed out above, releases the binoculars for movement about the axis X—X, will also cause the pin 57 to turn the arm 59 and hence the bolt 43 in a counterclockwise direction to thus move the head 44 out of clamping relation with the surface 45 of plate 41. However, upon release of the handle 50, the parts are returned by spring 40 to the position shown in Fig. 6. Such return movement will then cause the pin 57 to rotate arm 59 of bolt 43 in a clockwise direction to again bring the head 44 into clamping relation with plate 46 to lock the binoculars against movement about the axis Y—Y.

Thus the downward movement of the single handle 50 serves to simultaneously release the drum 14 and also to back off on bolt 43 so the binoculars 10 may be freed for selective movement about either or both the axes X—X and Y—Y. After the proper adjustment has been secured, or the device is to be no longer used, the handle 50 is released, whereupon the spring 40 again returns the parts into clamping relation to thereby prevent movement of the binoculars relatively to the ship or aeroplane. With this arrangement, the observer may, with one hand, release and adjust the binoculars both in azimuth and in elevation, thus leaving the other hand free to actuate the controls, or for any other purpose. The single spring 40 thus constitutes a single means to return the two clamping members in clamping position to thus effectively lock the binoculars against movement about either axis.

While the present embodiment has been described in connection with the use of a pair of binoculars, this is by way of illustration only and is not to be considered as a limitation, as it is apparent that such a construction or mount is adapted for use with any device which is to be moved about a pair of normally arranged axes and is to be clamped in any position of adjustment. For example, a telescope may be similarly mounted.

We claim:

1. In a mount, the combination with a support, of a device, means for mounting said device on said support for movement on the latter about normally arranged axes, means for separately locking said device against movement about each of said axes, means tending to release one of said locking means, means normally retaining both of said locking means in locking relation, and a control means for releasing said retaining means and for moving one of said locking means to permit the free and selective movement of said device about said axes.

2. In a mount, the combination with a support, of a device, means for mounting said device on said support for movement on the latter about normally arranged axes, means for separately locking said device against movement about each of said axes, means tending to release one of said locking means, means normally retaining both of said locking means in locking relation, and a control means for directly releasing one of said locking means and for moving said retaining means to render said releasing means operative to release the other locking means to permit said device to be moved selectively about said axes.

3. In a mount, the combination with a support, of a device, means for mounting said device on said support for movement on the latter about normally arranged axes, means for locking said device against movement about one of said axes, means tending to move said locking means to a releasing position, a separate means for locking said device against movement about the other of said axes, means directly connected to both of said locking means to releaseably hold them in locking relation, and a control means adapted to directly release said second locking means and to move said holding means to render said moving means effective to simultaneously release the first locking means to free said device for selective movement about said axes.

4. In a mount, the combination with a stationary support, of a frame carried by said support and movable about a vertical axis relative to said support, friction means for holding said frame against movement about said axis, spring means tending to move said friction means to released position, a device carried by said frame and movable relative thereto about a horizontal axis, friction means adapted to clamp said device against movement about said horizontal axis, means normally retaining said friction means in position to hold said device against movement about said axis, and means for releasing said second friction means and for rendering said spring means effective to release said first friction means to free said device for selective movement about said axis.

5. In a mount, the combination with a stationary support, of a frame carried by said support and movable about a vertical axis relative to said support, friction brake means for holding said frame against movement about said axis, spring means tending to release said brake means to free said frame for movement about said axis, a horizontal shaft carried by said frame, a device loosely mounted on and suspended from said shaft for movement about said shaft and relative to said frame but movable as a unit with the latter about said vertical axis, cooperating means on said device and said frame for holding said device against movement about said shaft, spring actuated means operatively connected to said brake means and said cooperating means and adapted to overcome the effect of said first spring means so as to normally retain said brake means and said cooperating means in holding relation, and means for simultaneously releasing said braking and locking means to free said device for independent movement about said shaft or movement as a unit with said frame about said vertical axis.

6. A mount comprising, in combination, a stationary support having a vertically depending shaft, a brake drum fixedly carried by said shaft, a frame loosely supported by said shaft, a horizontal shaft carried by said frame, a device loosely supported by and depending from said second shaft, a brake band engaging said drum, and having one end fixed to said horizontal shaft, a sleeve loosely mounted on said second shaft, a post carried by said sleeve and connected to the other end of said band, spring means carried by said shaft and engaging said sleeve and tending to move the latter and said post in a direction to loosen said band to free said frame so that the latter may be moved about said first shaft, spring actuated means carried by said second shaft and adapted to overcome said first spring means to shift said sleeve and post in the opposite direction to clamp said band on said drum to hold said frame against movement about said first shaft, releasable means carried by said device and engaging said frame to clamp the device against movement about said second shaft, and a releasing means operatively connected to said spring actuated means to move the latter to render said first spring means effective to release said band to free said frame for vertical movement about said first shaft and to move simultaneously said releasable means to free said device for movement about said second shaft.

7. A mount comprising, in combination, a stationary support having a vertically depending shaft, a brake drum fixedly carried by said shaft, a frame loosely supported by said shaft, a horizontal shaft carried by said frame, a device loosely supported by and depending from said second shaft, a brake band engaging said drum and having one end anchored to said second shaft, a sleeve loosely mounted on said second shaft, a post carried by said sleeve and connected to the other end of said band, spring means carried by said shaft and engaging said sleeve and tending to move the latter and said post in a direction to loosen said band to free said frame so that the latter may be moved about said first shaft, spring actuated means carried by said second shaft and adapted to overcome said first spring means to shift said sleeve and post in the opposite direction to clamp said band on said drum to hold said frame against movement about said first shaft, a stud threaded into said device and formed with a head adapted to engage said frame to frictionally hold said device against movement about said second shaft and relative to said frame, a slotted arm carried by said stud, a link connecting said arm and said spring actuated means and movable in one direction by the latter so as to move said sleeve and post in said opposite direction and to rotate said stud to lock simultaneously said device against movement about said second shaft and against unitary movement of said device and frame about said first shaft, and an operating handle connected to said link for moving the latter to shift said spring actuated means to release said sleeve to render the first spring means effective to move said band to free said frame for movement about said vertical axis and to rotate simultaneously said stud to loosen the latter to free said device for movement about said second shaft.

8. A mount comprising, in combination, a stationary support having a vertically depending shaft, a brake drum fixedly mounted on said shaft, a frame loosely mounted on said shaft and supported by said brake drum, a horizontal shaft carried by said frame, a brake band engaging said drum and having one end secured to said second shaft, a sleeve loosely mounted on said shaft, a post carried by said sleeve and connected to the other end of said band, a spring carried by said shaft and engaging said sleeve and tending to move the latter and said post in one direction to loosen said band to permit said frame to move on said first shaft, a pair of cams carried by said second shaft, a spring connected to one of said cams and overcoming said first spring to rotate the one cam in one direction to shift said sleeve and post against the action of said first spring to move said band into engaging relation with said drum to lock said frame against movement relative to said first shaft, a device loosely supported on and depending from said second shaft, a stud threadedly engaging said device, a head on said stud adapted to frictionally engage said frame to clamp said device for movement about said second shaft, a slotted arm extending radially from said stud, a link connecting said arm to said second spring so that the latter will rotate said stud to clamp said device when said cam is rotated in said one direction to shift said sleeve, and a handle connected to said link to shift the latter to move said one cam in another direction against the action of said second spring to render said first spring effective to move said sleeve and post in said one direction to release said band to free said frame for movement about said first shaft and to move simultaneously said slotted arm to rotate said stud to loosen the latter to free said device for movement about said second shaft.

JOSEPH MIHALYI.
HARLOW D. PHILIPS.

REFERENCES CITED

The following references are of record in the file of this patent:

UNITED STATES PATENTS

| Number | Name | Date |
|---|---|---|
| 1,502,173 | Chamberlin | July 22, 1924 |
| 1,517,550 | Fairchild | Dec. 2, 1924 |
| 1,790,030 | Turner | Jan. 27, 1931 |
| 2,128,409 | Hager | Aug. 30, 1938 |
| 2,305,233 | Blaschke | Dec. 15, 1942 |
| 2,364,363 | Howell | Dec. 5, 1944 |
| 2,424,499 | Pasturczak | July 22, 1947 |